No. 709,615. Patented Sept. 23, 1902.
J. R. THOMPSON.
LACE PAPER MACHINE.
(Application filed Aug. 7, 1901.)
(No Model.)
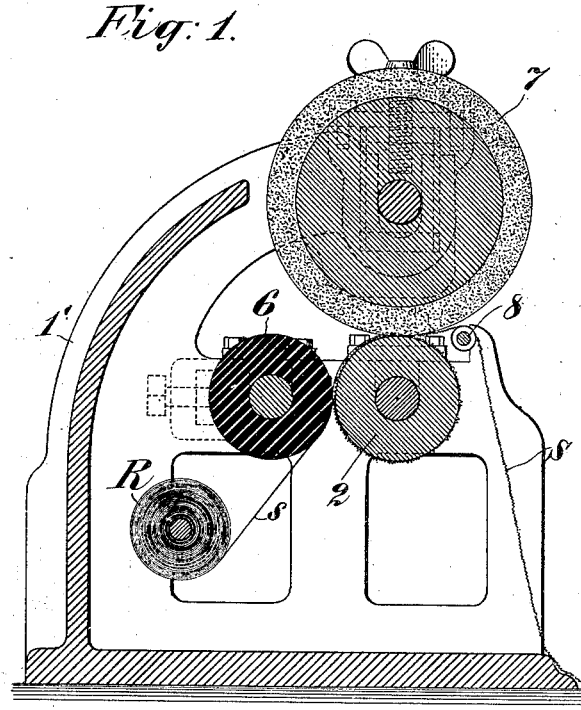
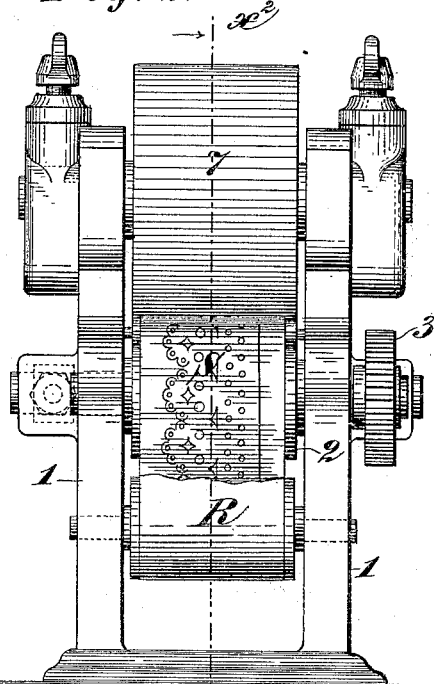
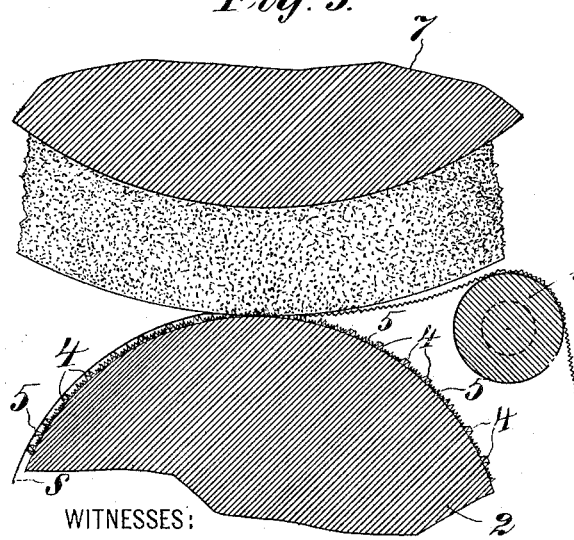
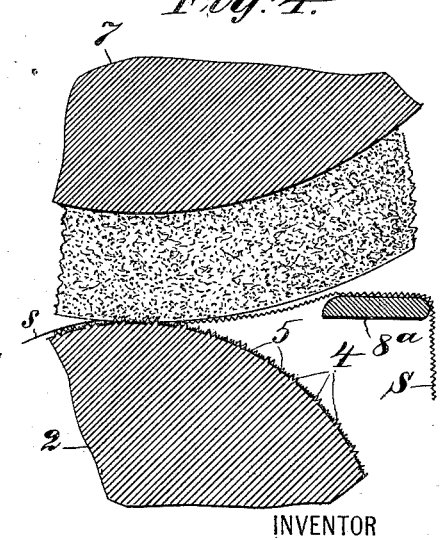
WITNESSES:
J. W. Wiman
Peter N. Ross
INVENTOR
John R. Thompson
BY
Henry Connett
ATTORNEY

UNITED STATES PATENT OFFICE.

JOHN R. THOMPSON, OF BROOKLYN, NEW YORK.

LACE-PAPER MACHINE.

SPECIFICATION forming part of Letters Patent No. 709,615, dated September 23, 1902.

Application filed August 7, 1901. Serial No. 71,152. (No model.)

*To all whom it may concern:*

Be it known that I, JOHN R. THOMPSON, a citizen of the United States, residing in the borough of Brooklyn, in the county of Kings and city and State of New York, have invented certain new and useful Improvements in Lace-Paper Machines, of which the following is a specification.

This invention relates to a machine for producing in a continuous manner from a strip of paper a fabric having a pattern formed in it by puncturing, cutting through, and embossing in imitation of lace. Ordinarily this lace-paper has been produced in embossing-presses in short pieces or sections, and where attempts have been made to produce it with rolls in a continuous manner a difficulty has been encountered in producing continuous strips and rapidly by the breaking across and parting of the strip where it passes away from the rolls.

This invention has for its object to provide a machine having a die-roll, a cutting-roll, an embossing-roll, and a delivery device or guide which will produce a continuous strip of lace-paper rapidly and perfectly and without breaking or tearing the strip as it frees itself from the rolls.

In the accompanying drawings, which illustrate an embodiment of the machine, Figure 1 is a vertical section of the machine on line x' in Fig. 2, and Fig. 2 is a front elevation of the same as seen from the right in Fig. 1. Fig. 3 is an enlarged fragmentary sectional view showing the preferred delivery device, and Fig. 4 is a similar view showing a modified form of said device.

Referring to the first three figures of the drawings primarily, 1 represents a strong and suitably-constructed frame, in which is rotatively mounted a die-roll 2, of steel, adapted to be driven by hand or a motor. As shown in Fig. 2, it is provided on its prolonged journal with a toothed wheel 3 for driving. This feature, however, is not important. The wheel 3 might, for example, be a pulley to receive a belt, or a crank if the machine is to be operated by hand. The die-roll 2 will be of steel engraved to form on the paper a continuous embossed and perforated lace-like pattern or a continuous series of repeated patterns. On its face it will have properly disposed and arranged (as the pattern may require) numerous cutters or cutting-punches (indicated at 4 in Fig. 3) and also certain elevated portions 5 for forming the pattern in relief by embossing.

Mounted in the frame 1 is a cutting-roll 6, preferably of hard rubber, indurated fiber, or the like, said roll being in peripheral contact with the cutters or cutting-punches 4 on the die-roll 2, and mounted also in the frame in embossing contact with the die-roll 2 is an embossing-roll 7, which is made in whole or in part of some relatively yielding material, into which the relief or embossing surface 5 may press the paper in forming the lace-paper. These two rolls 6 and 7 are provided with devices for pressing or setting them up to the die-roll 2.

R represents the roll of paper to be converted into a continuous strip of lace-paper S. The strip s of plain paper from the roll R first passes between the cutting-roll 6 and the die-roll 2, whereby the cutters or cutting-punches 4 on the die-roll cut out the portions necessary to the lace-pattern, and this apertured strip then passes between the die-roll and the embossing-roll 7, whereby the proper embossments are formed in the strip. The cutters 4 and the relief portions 5 on the die-roll are pressed into the somewhat yielding material of the roll 7, forcing the paper of the strip into the said roll. If the lace-paper strip S thus made be permitted liberty to free itself from the rolls, the strain brought upon the same by the engagement with it of the withdrawing projecting cutters 4, resisted by the adherence of the embossed paper in the hollows of the roll 7, due in a great measure to the crimping and shortening of the strip of paper lengthwise at the embossing-point, will form breaks across the weakened strip at intervals, varying in frequency to some extent, as experience shows, with the character of the lace design and the quality of the paper used, and becoming more frequent as the speed of the machine is increased. To obviate this defect and to permit the machine to be run at a relatively high rate of speed, it is found necessary to so guide the lace-paper strip as it leaves the bite of the rolls 2 and 7 that it will be freed from the cutters 4 of the roll 2 as near the embossing-point as possible, and as they recede below the level or below a horizontal plane passing through the embossing-point. Moreover, the guiding direction should be such as to allow the lace-paper strip to fall away from the embossing-roll, from which its own weight will ordinarily free it. This guiding of the lace-paper strip is effected by preference by a transverse bar 8 in the form of a roller set in quite close to the rolls 2 and 7, as best shown in Fig. 3, and such a level as to cause the strip to hug the embossing-roll closely until the cutters 4 on the die-roll fully disengage themselves and then allow said strip to fall away from the roll 7 and free itself from the embossing-spaces therein.

It is not absolutely essential that the bar 8, over which the lace-paper strip passes, shall be a roller, although a roller is preferred. It might be a plain, smooth, non-rolling bar, as 8ª in Fig. 4, for example.

Having thus described my invention, I claim—

1. In a lace-paper machine, the combination with the die-roll, having on its face projecting cutters and surfaces in relief for embossing, of the cutting-roll in peripheral contact with the die-roll on the side where the strip of paper enters, and the embossing-roll of yielding material bearing on the top of the die-roll, of guiding means, at the point where the strip emerges from the bite of the die-roll and embossing-roll, said guiding means adapted to support the strip of paper while the cutters are drawing out the same, and then permit the strip to fall away from the embossing-roll, whereby the moving strip of lace-paper is freed from the rolls without parting, substantially as set forth.

2. In a machine for producing a continuous strip of lace-paper, the combination with a die-roll having on its face cutters 4 and embossing, relief surfaces, 5, a cutting-roll 6, and an embossing-roll 7, with a yielding surface, situated over the die-roll, of a transverse guide parallel with the roll-axes and situated a little above a horizontal plane passing through the bite of the rolls 2 and 7, near the point of discharge of the lace-paper strip, the latter passing out over said guide and being relieved thereby successively from the cutters on the die-roll and the embossing-recesses in the roll 7, substantially as set forth.

3. The combination with the die-roll 2, having cutters 4 and relief-surfaces 5 on its face, the cutting-roll 6, in peripheral contact with the die-roll where the strip of paper enters, the yielding embossing-roll 7, situated above the die-roll and in embossing contact therewith, and the guide 8, in the form of a roller, said guide having its axis substantially parallel with the roll-axes and its upper surface slightly above the horizontal plane through the embossing-point, substantially as set forth.

In witness whereof I have hereunto signed my name, this 6th day of August, 1901, in the presence of two subscribing witnesses.

JOHN R. THOMPSON.

Witnesses:
HENRY CONNETT,
PETER A. ROSS.